(12) United States Patent
Bessette et al.

(10) Patent No.: US 8,911,031 B2
(45) Date of Patent: Dec. 16, 2014

(54) TRACK SYSTEM

(75) Inventors: Robert Bessette, Saint-Charles-de-Drummond (CA); Louis-Frédéric Marchildon, St-Charles-de-Drummond (CA); Steve Fréchette, Drummondville (CA); Jonathan Thibault, Shefford (CA); André Léger, Drummondville (CA)

(73) Assignee: Soucy International Inc., Drummondville, QC (CA)

( * ) Notice: Subject to any disclaimer, the term of this patent is extended or adjusted under 35 U.S.C. 154(b) by 427 days.

(21) Appl. No.: 13/380,675

(22) PCT Filed: Jun. 30, 2010

(86) PCT No.: PCT/CA2010/001011
§ 371 (c)(1),
(2), (4) Date: Dec. 23, 2011

(87) PCT Pub. No.: WO2011/000093
PCT Pub. Date: Jan. 6, 2011

(65) Prior Publication Data
US 2012/0090903 A1 Apr. 19, 2012

Related U.S. Application Data

(60) Provisional application No. 61/221,821, filed on Jun. 30, 2009.

(51) Int. Cl.
*B62D 55/084* (2006.01)
*B62D 55/04* (2006.01)

(52) U.S. Cl.
CPC .............. *B62D 55/04* (2013.01); *B62D 55/084* (2013.01)
USPC ............ 305/128; 305/131; 305/135; 305/142

(58) Field of Classification Search
CPC ...... B62D 55/04; B62D 55/08; B62D 55/084; B62D 55/12
USPC ......... 305/124, 125, 127, 128, 129, 130, 131, 305/132, 135, 142; 180/9.26, 9.28, 9.3, 180/9.46
See application file for complete search history.

(56) References Cited

U.S. PATENT DOCUMENTS 3,841,424 A * 10/1974 Purcell et al. .................. 180/9.5
4,953,919 A * 9/1990 Langford ...................... 305/144

(Continued)

FOREIGN PATENT DOCUMENTS

| CN | 1655980 | | 8/2005 |
| JP | 2001058587 A | * | 3/2001 |
| WO | WO 2006066406 A1 | * | 6/2006 |

*Primary Examiner* — Kip T Kotter
(74) *Attorney, Agent, or Firm* — Brouillette & Partners; Robert Brouillette (57) ABSTRACT

This invention generally relates to track systems and traction assemblies for use as wheel replacement for normally wheeled vehicles. The track system uses a traction band disposed about a sprocket wheel, idler wheels and road wheels for propulsion. The idler wheels and road wheels are typically pivotally mounted to a support frame, itself configured to be coupled to the sprocket wheel via a support member. The track system also comprises a movement limiting link mounted both to the support member and to the vehicle frame. The movement limiting link limits longitudinal and lateral movements of the track system, such as to prevent contact between the track system and the vehicle.

22 Claims, 10 Drawing Sheets

(56) References Cited

U.S. PATENT DOCUMENTS

| | | | |
|---|---|---|---|
| 5,842,757 A * | 12/1998 | Kelderman | 305/125 |
| 5,954,148 A * | 9/1999 | Okumura et al. | 180/9.21 |
| 6,810,975 B2 * | 11/2004 | Nagorcka et al. | 180/9.5 |
| 2006/0181148 A1 * | 8/2006 | Bessette | 305/124 |
| 2007/0017714 A1 * | 1/2007 | Brazier | 180/9.3 |
| 2007/0240917 A1 | 10/2007 | Duceppe | |

* cited by examiner

DETAIL A

DETAIL B

FIG. 9

TRACK SYSTEM

CROSS-REFERENCE TO RELATED APPLICATIONS

The present patent application claims the benefits of priority of commonly assigned U.S. Provisional Patent Application No. 61/221,821, entitled "Limited Encroachment Track System" and filed at the United States Patent and Trademark Office on Jun. 30, 2009, the content of which is incorporated herein by reference.

FIELD OF THE INVENTION

The present invention generally relates to track systems used as wheel replacements on normally wheeled vehicles. More particularly, but in no limitative fashion, the present invention relates to track systems for replacing wheels on heavy vehicles such as, but not limited to, construction, industrial, forestry, agricultural and farming vehicles.

BACKGROUND OF THE INVENTION

Traction and flotation have always been important issues with farming and construction vehicles. Having a vehicle mounted on track systems assures lower ground pressure, better traction and better use of the available power. This is particularly important when the vehicle is operated on soft ground condition or when increased traction effort is required.

One of the challenges when fitting a track system in replacement of a wheel is to fit the track system within the available space envelope of the former wheel. Typical track systems, which feature a pivoting motion, tend to interfere with surroundings equipments such as fenders, fuel or oil tanks, vehicle chassis, three point hitches, etc.

One of the solutions proposed in prior art track systems is to have a pivot point lower than the rotation axis of the sprocket wheel. Track systems having such a lower pivot point are generally more stable and interfere less with the vehicle and its surrounding equipments. However, having a lower pivot point does not address all the problems related to the replacement of wheels with track systems.

Hence, there is a need for track systems which can preferably offer most if not all the advantages of track propulsion while fitting in the space envelop of the wheels they replace.

SUMMARY OF THE INVENTION

The present invention therefore provides a solution to the shortcomings of the prior art by providing a track system which movements are limited such as to prevent interference with the vehicle and its accessories.

In accordance with the principles of the present invention, the track system generally comprises a sprocket wheel configured to be mounted to one of the wheel axles or wheel hubs of the vehicle, a support frame connected to the sprocket wheel via a support member pivotally mounted to both the sprocket wheel and the support frame, and a longitudinally extending endless traction band or track mounted thereabout. The support frame typically pivotally supports wheels such as idlers wheels mounted at the fore and at the aft, and road wheels mounted along the length thereof.

In accordance with the present invention, the track system is further provided with a movement limiting link mounted to the support member and configured to be mounted to the vehicle frame. The movement limiting link limits the movements of the track system, such as to prevent contacts between the track system and the vehicle. The link allows the support frame to pivot with respect to the support member but prevents longitudinal movements (i.e. forward and/or rearward movements) and lateral movements (i.e. side movements) of the support frame relatively to the support member.

The track system is preferably adaptable to a plurality of vehicle sizes; indeed, the length and configuration of the link may be adapted and/or modified. In one embodiment, the link comprises two sections that may be screwed or unscrewed to modify the configuration of the link. Also, the first end and the second end of the link may be connected at different places on the support member and/or on the frame of the vehicle to adapt the track system to a particular vehicle or to change the configuration of a vehicle.

Though the present invention is particularly useful for track systems used on farming and generally agricultural vehicles, the present invention could also be used on vehicles used in other industries such as in the construction industry, or in the forestry industry.

Other advantages and novel features of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which:

FIG. 9 is perspective and partially exploded view of the interior side of the track system of FIG. 1, showing a portion of the vehicle axle/hub and frame.

DETAILED DESCRIPTION OF THE PREFERRED EMBODIMENT

A novel track system will be described hereinafter. Although the invention is described in terms of specific illustrative embodiments, it is to be understood that the embodiments described herein are by way of example only and that the scope of the invention is not intended to be limited thereby.

Figure 1:
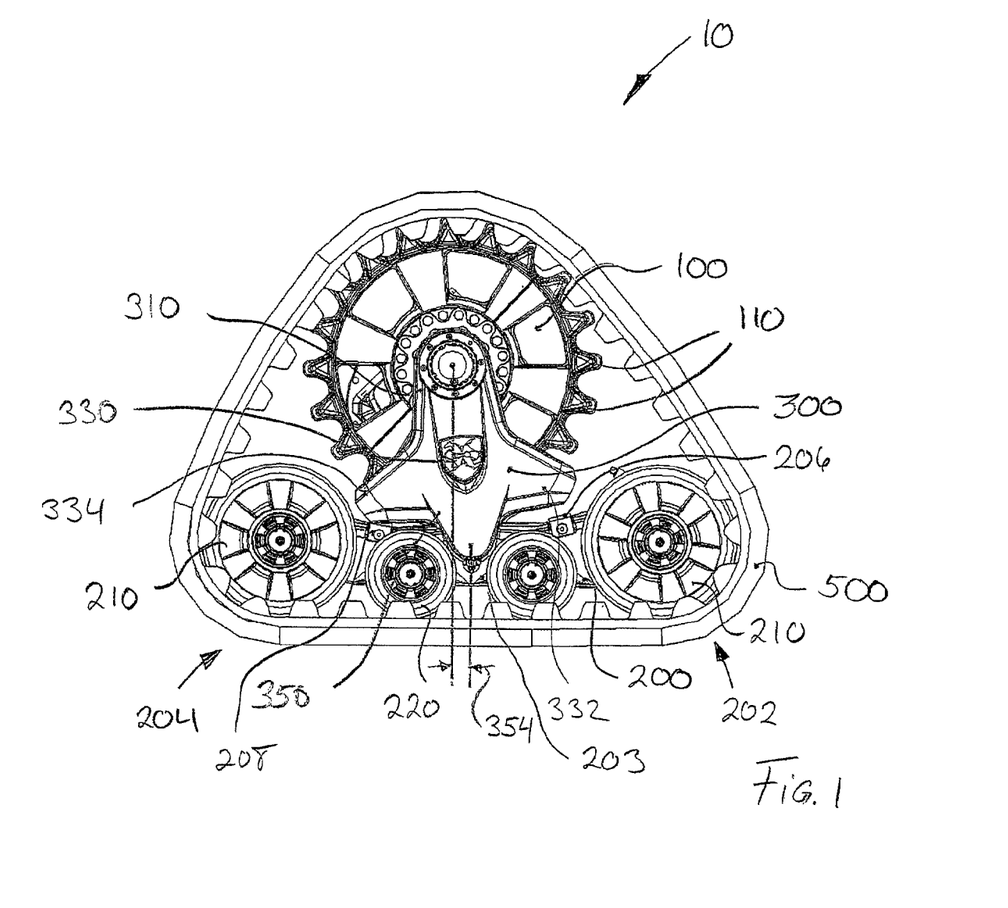
FIG. 1 is an elevation view of the exterior or outer side of an exemplary track system in accordance with the present invention.
Figure 2:
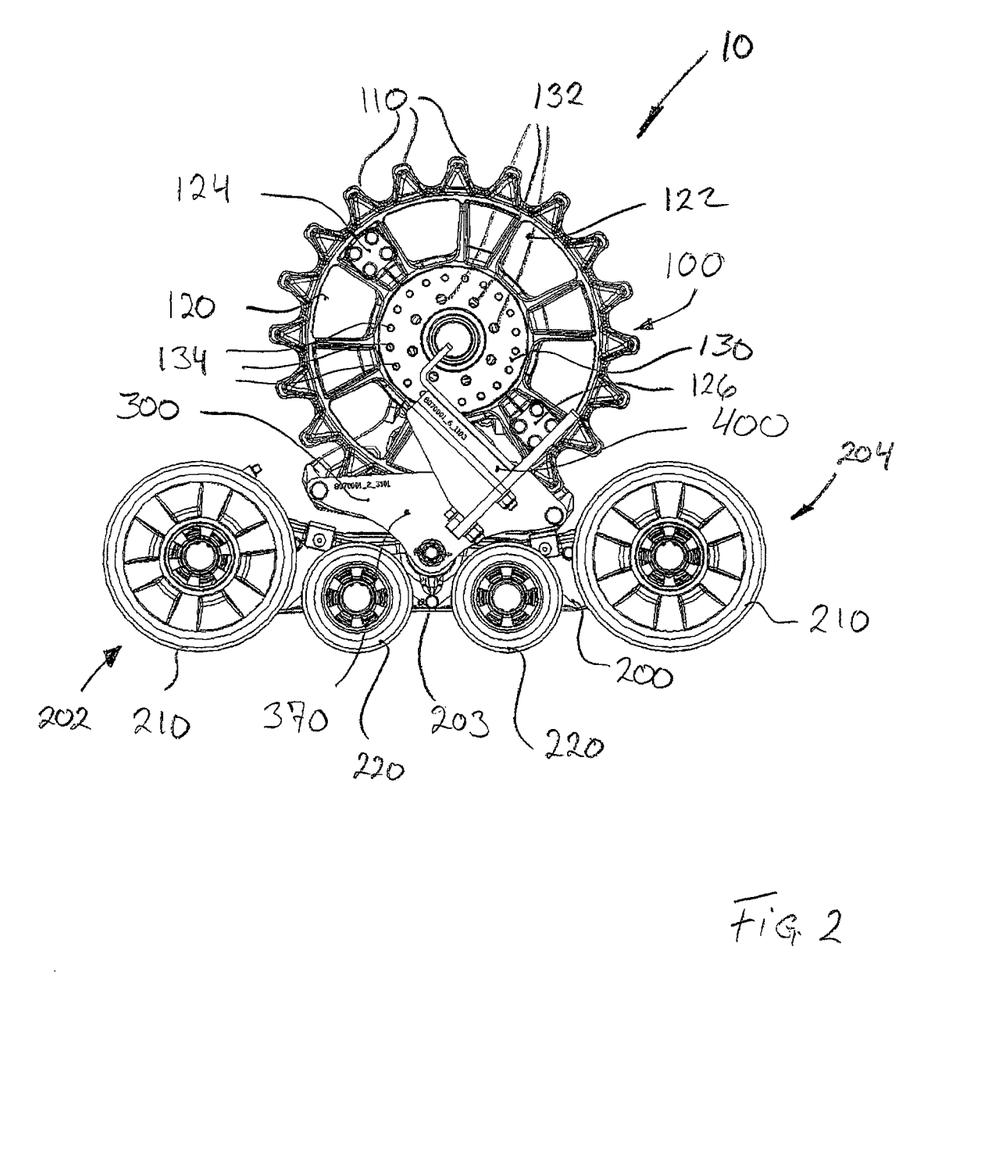
FIG. 2 is an elevation view of the interior or inner side of the track system of FIG. 1, without the traction band.

Referring first to FIGS. 1 and 2, an exemplary track system 10, incorporating the principles of the present invention, is illustrated. The track system 10 typically comprises a sprocket wheel 100 configured to be mounted to the wheel axle or hub 600 (see FIGS. 8 and 10) of a vehicle (not shown), a support frame 200, a support member 300 pivotally connected to both the sprocket wheel 100 and the support frame 200, a movement limiting link 400 connected to support member 300, and an endless traction band 500 disposed around the sprocket wheel 100 and the support frame 200.

Referring to FIGS. 2, 5, 6 and 8, the sprocket wheel 100 generally comprises a plurality of generally evenly spaced sprocket teeth 110 located at the periphery thereof. The sprocket teeth 110 are configured to drivingly engage the drive lugs 534 of the traction band 500 which will be described in more details below (see FIG. 8).

In the present embodiment, the sprocket wheel 100 is comprised of two generally semi-circular sections 120 and 122 which are configured to be mounted together via attaching plates 124 and 126 and appropriate fasteners such as bolts and nuts.

Still referring to FIGS. 2, 5, 6 and 8, the sprocket wheel 100 further comprises a circular disk 130 having formed therein first circularly disposed apertures 132 configured to reflect the bolt pattern of the vehicle axle/hub 600 such as to receive the mounting bolts 610 thereof (see particularly FIGS. 8 and 10), and second circularly disposed apertures 134 configured to receive the fastening bolts of the sprocket wheel 100 and of the flange 316 of the shaft 312 which will be described in more details below.

Understandably, in some other embodiments, the two sections 120 and 122 of the sprocket wheel 100 could be unitary or the sprocket wheel 100 could have more than two sections 120 and 122. In addition, in still other embodiments, the disk 130 could be unitary with the sprocket wheel 100 or could even be omitted if, for example, the configuration of the vehicle axle/hub 600 and/or the configuration of the sprocket wheel 100 allows for a direct bolting of the shaft 312 to the sprocket wheel 100.

Figure 5:
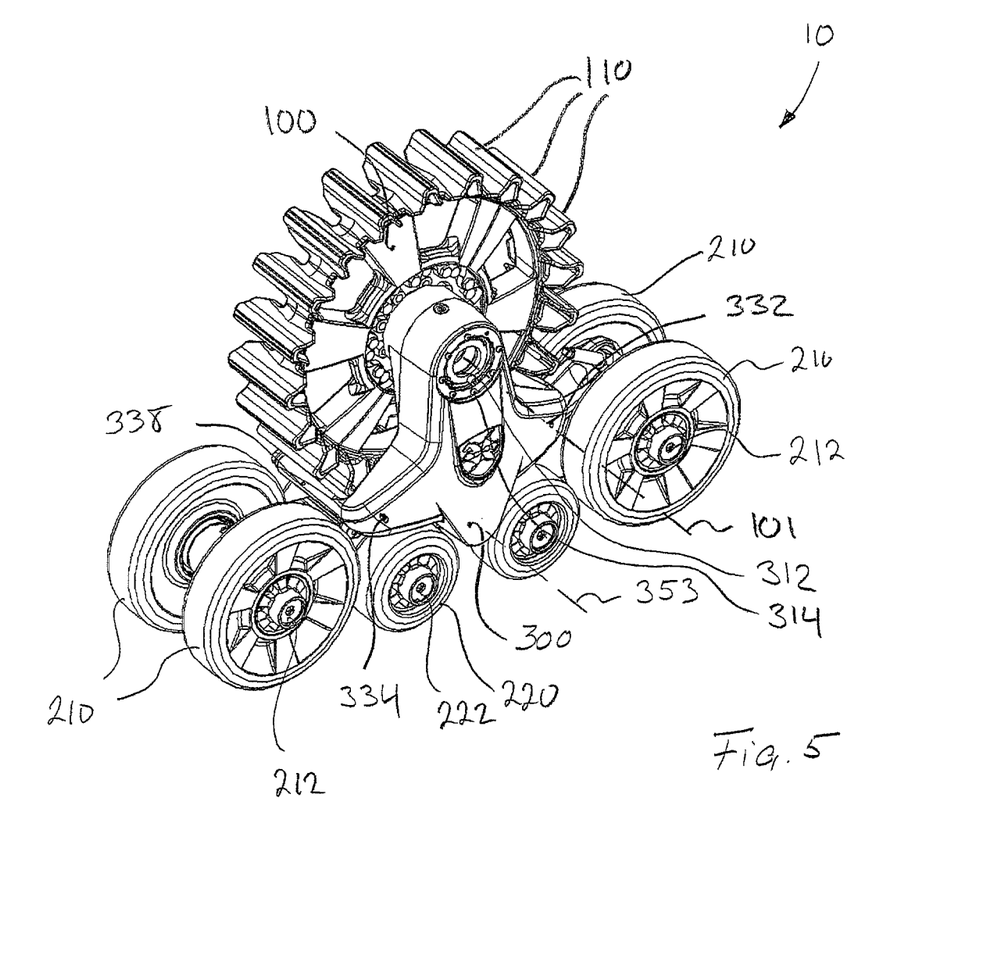
FIG. 5 is a perspective view of the exterior side of the track system of FIG. 1, without the traction band.

Referring back to FIGS. 1, 2, 5, 6 and 8, the support frame 200 is generally configured as a generally longitudinally extending structure having pivotally mounted thereto a plurality of wheels such as idler wheels 210 respectively mounted at the front end 202 and at the rear end 204 of the support frame 200, and road wheels 220 mounted along the length of the middle portion 203 of the support frame 200 between the front and rear idler wheels 210. As best illustrated in FIGS. 5 and 10, in the present embodiment, the idler wheels 210 and the road wheels 220 are mounted on either sides of the support frame 200 via cantilevered shafts 212 (for the idler wheels 210) and shafts 222 (for the road wheels 220).

Understandably, in some other embodiments, the wheels 210 and 220 could be mounted to axles pivotally mounted within the support frame 200. Still, other configurations are possible.

Figure 8:
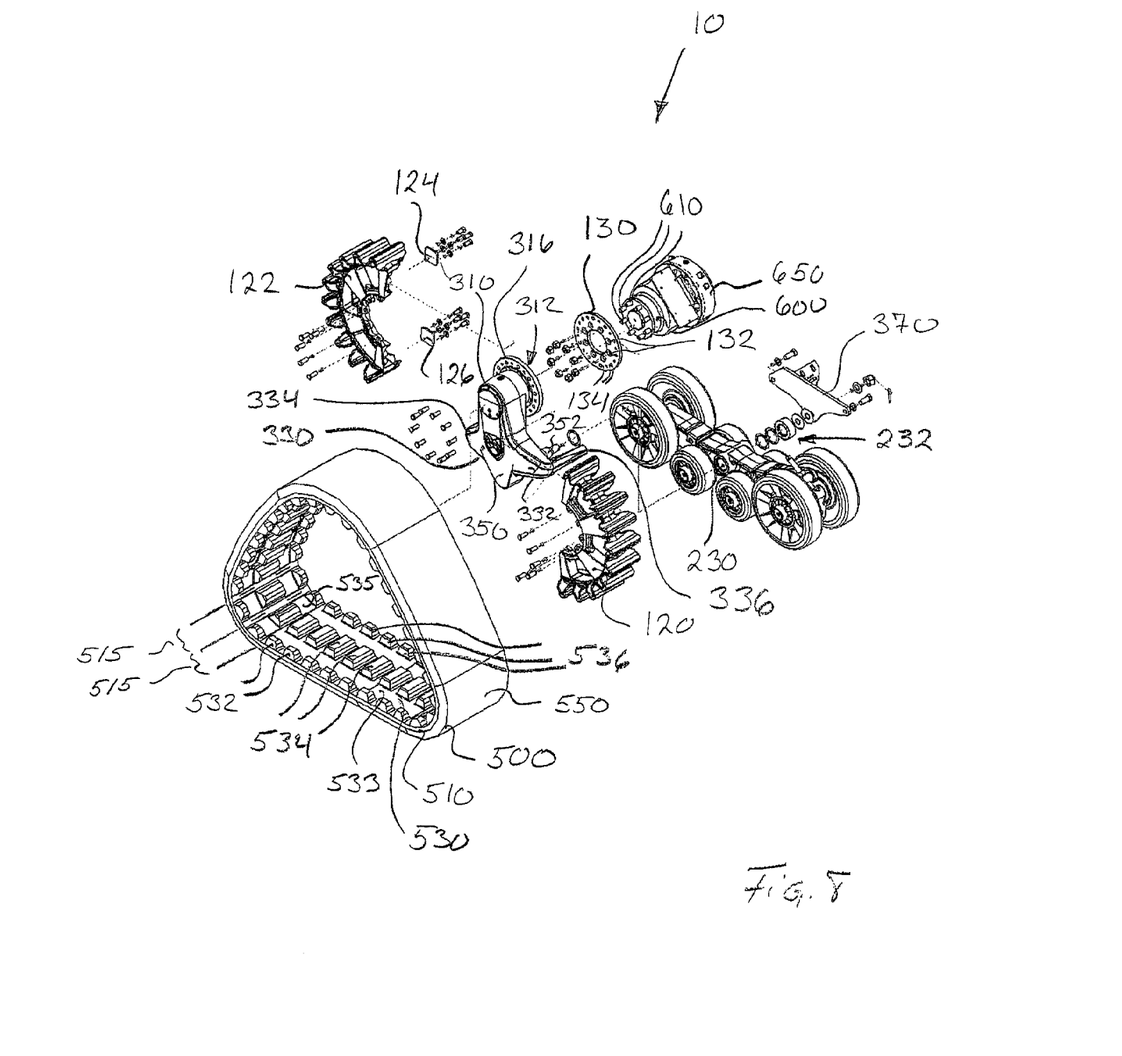
FIG. 8 is an exploded view of the track system shown in FIG. 1.
Figure 10:
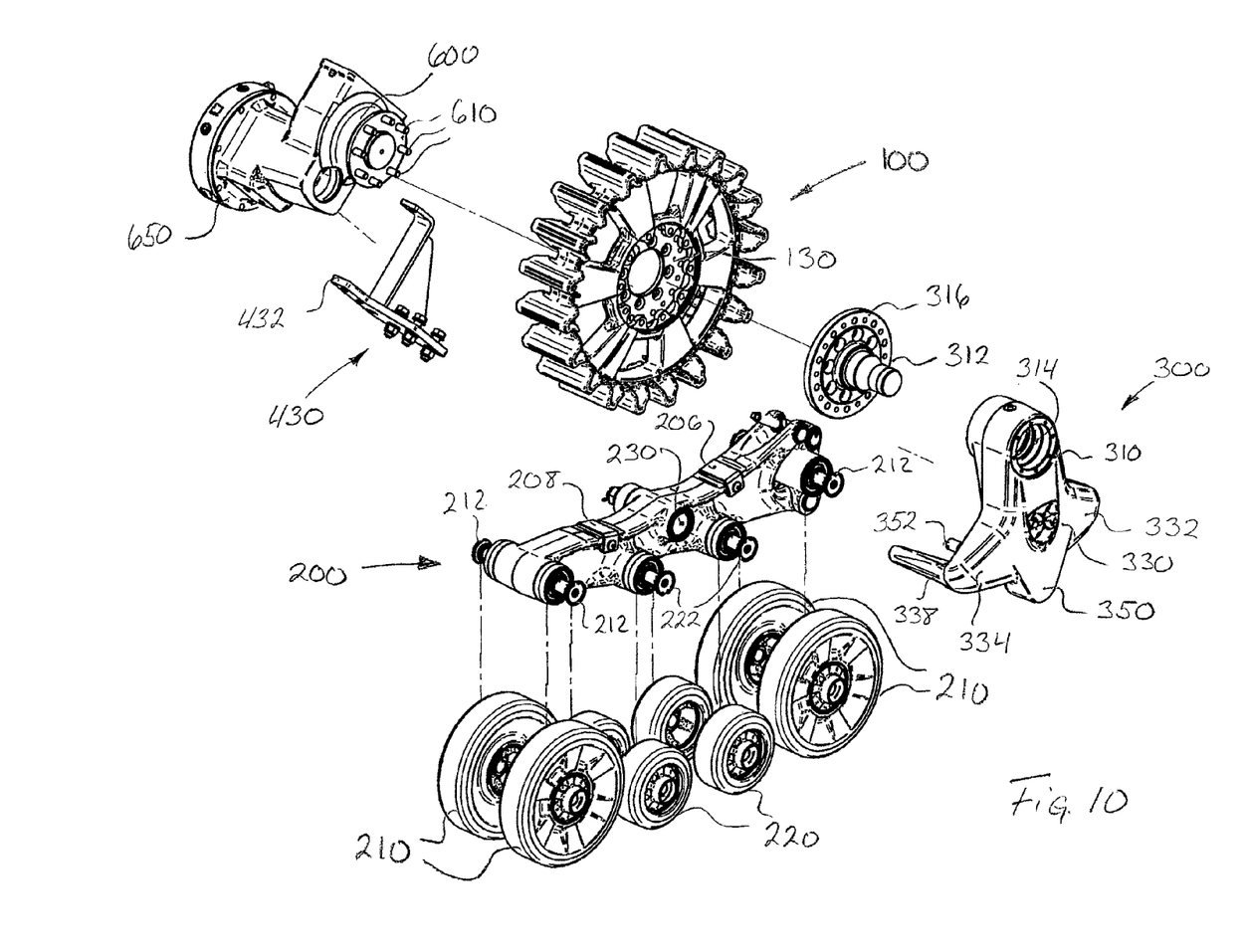
FIG. 10 is another exploded view of the track system shown in FIG. 1, without the traction band.

Referring now to FIGS. 8 and 10, the support frame 200 is further provided with a transverse opening 230 extending laterally through the support frame 200 and configured to pivotally receive the lower shaft 352 of the support member 300 and one or more bearings and seals assembly 232.

As best shown in FIGS. 1 and 2, the opening 230 is substantially centrally located with respect to the length of the support frame 200. Still, in some other embodiments, the opening 230 could be located nearer the front end 202 or nearer the rear end 204.

Referring now to FIGS. 1, 2, 5, 6, 8 and 10, the support member 300 is shown in more details.

As illustrated in the figures, the support member 300 is generally configured as a generally vertically extending structure which generally comprises an upper portion 310, a middle or intermediate portion 330, and a lower portion 350. In the present embodiment, the support member 300 also comprises a back member or plate 370, best shown in FIGS. 2 and 6, secured to the middle portion 330 and lower portion 350.

The upper portion 310 is configured to be pivotally, yet not drivingly, engaged to the sprocket wheel 100. In that sense, the upper portion 310 comprises a shaft 312 pivotally mounted within a transverse opening 314 (best shown in FIG. 10), via an assembly of bearings or rollers. As best illustrated in FIGS. 8 and 10, the shaft 312 comprises, at its extremity adjacent to the sprocket wheel 100, a radially extending flange 316 configured to be secured to the disk 130 of the sprocket wheel 100 as explained above. In that sense, the flange 316 is provided with apertures 317 matching some or all of the apertures 134 of the disk 130. Understandably, in some other embodiments, the flange 316 could be directly mounted to the sprocket wheel 100 without the need for a disk 130.

The skilled addressee will understand that, as the shaft 312 is fixedly connected to the sprocket wheel 100, via the disk 130, rotation of the sprocket wheel 100 will cause rotation of the shaft 312 within the opening 314 of the upper portion 310 of the support member 300. However, since the shaft 312 is pivotally mounted within the opening 314, the rotation of the shaft 312 will not induce rotation of the support member 300.

The middle portion 330 of the support member 300 comprises a front or forward projection 332 and a rear or rearward projection 334. The front projection 332 comprises, at its extremity, a front arm 336 (best shown in FIGS. 6 and 8), and, similarly, the rear projection 334 comprises, at its extremity, a rear arm 338 (best shown in FIG. 5). The front and rear arms 336 and 338 extend laterally toward the inner side of the track system 10.

In the present embodiment, the front and rear arms 336 and 338 are substantially parallel.

The front and rear arms 336 and 338 serve two purposes. First, the front and rear arms 336 and 338 act as stoppers for limiting the rotating movement of the support frame 200 about the rotation axis 353 (see FIGS. 5 and 6) of the shaft 352. Hence, if the support frame 200 pivots about the axis 353, upward movements of the front end 202 or of the rear end 204 will be limited or stopped by either one of the front and rear arms 336 and 338. Understandably, to prevent damages either to the front and rear arms 336 and 338 or to the support frame 200, front and rear elastomeric stoppers 206 and 208 are preferably provided on the top surface of the support frame 200 as shown in FIGS. 1, 8 and 10.

Figure 6:
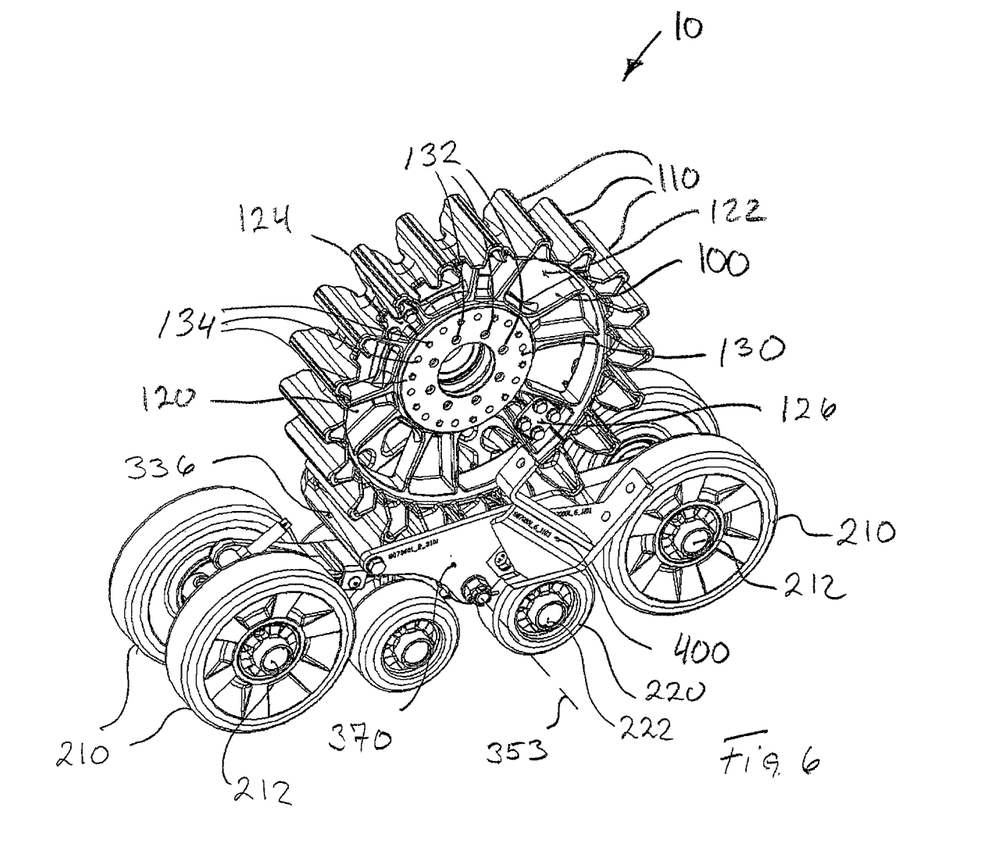
FIG. 6 is a perspective view of the interior side of the track system of FIG. 1, without the traction band.

Second, as shown in FIGS. 5, 6, 8 and 9, the front and rear arms 336 and 338 rigidly link the middle portion 330 of the support member 300 to the back plate 370. In that sense, as shown in FIG. 6, the back plate 370 is preferably bolted to the front and rear arms 336 and 338. As it will be best explained below, the movement limiting link 400 is connected to both the back plate 370 and the vehicle such as to prevent movement of the support member 300.

Still, in some other embodiments, the back plate 370 could be embodied by other functionally equivalent structures (e.g. back member) and/or could be unitary with the arms 336 and 338.

The skilled addressee will note that the front arm 336 passes in front of the sprocket wheel 100 whereas the rear arm 338 passes behind the sprocket wheel 100.

The lower portion 350 of the support member 300 generally comprises a shaft 352, already introduced, which extends laterally toward the inner side of the track system 10.

As explained above, the shaft 352 is received into the transverse opening 230 of the support frame 200 such as to allow pivotal movements of the support frame 200 with respect to the support member 300.

As best shown in FIG. 8, the free extremity of the shaft 352 is preferably connected to the back plate 370 for additional support. Understandably, even though the back plate 370 could be connected to the support frame 200, the connection is not rigid.

At this point, it is important to note that, in the present embodiment, the rotation axis 353 of the shaft 352 is slightly shifted forward with respect to the rotation axis 101 of the sprocket wheel 100 (see FIG. 1).

There can be several advantages to have a longitudinal shift 354 between the rotation axis 353 of the shaft 352 and the rotation axis 101 of the sprocket wheel 100. For instance, the weight distribution of the vehicle can be shifted toward the front end 202 or the rear end of the support frame 200 of the track system 10. Also, the wheelbase of the vehicle can be modified (i.e. lengthened or shortened) to improve, for example, the stability thereof.

Understandably, the longitudinal distance 354 between the two rotation axes 353 and 101 can vary. Also, the rotation axis 353 is not necessarily always shifted forwardly as in FIG. 1. For instance, a track system 10 replacing the rear wheel of a front loader could have its rotation axis 353 shifted rearwardly with respect to the rotation axis 101. Furthermore, the track systems 10 replacing the front wheels of a vehicle could have a forward shift whereas the track systems 10 replacing the rear wheels of the same vehicle could have a rearward shift in order to extend the wheelbase of the vehicle.

It remains that, in some other embodiments, the rotation axis 353 could be vertically aligned with the rotation axis 101 such that the distance 354 would be equal to zero.

In addition, though the two rotation axes 353 and 101 are preferably parallel, they could, in some embodiments, be slightly angled with respect to each other. A small angle between the two axes 353 and 101 could, for example, pre-camber the track system 10 to take into account some of the deflections that the track system 10 will sustain in operation.

Referring now to FIGS. 3, 4 and 6-9, the movement limiting link 400 is illustrated in more details.

Figure 3:
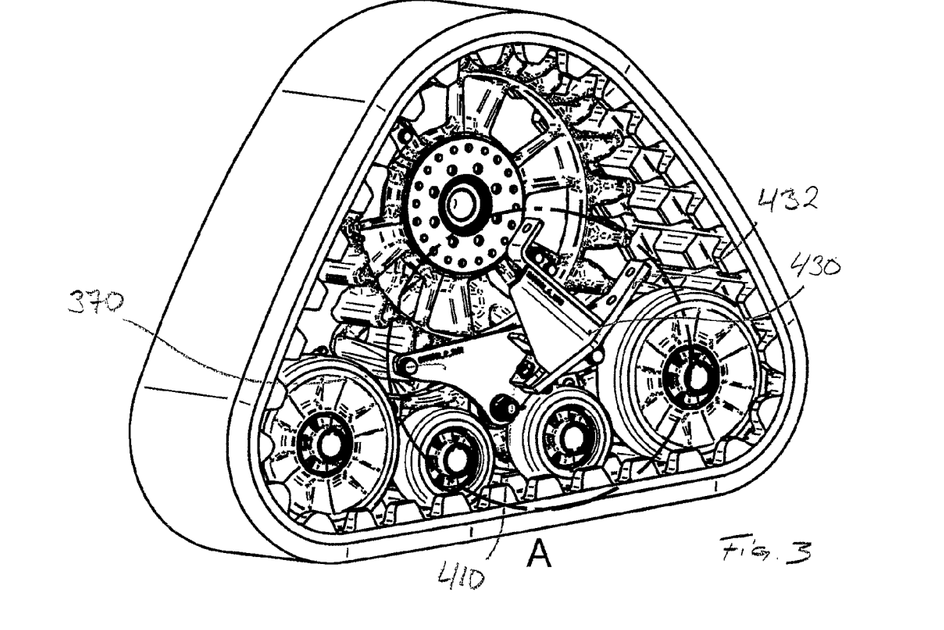
FIG. 3 is a perspective view of the interior side of the track system of FIG. 1.
Figure 3A:
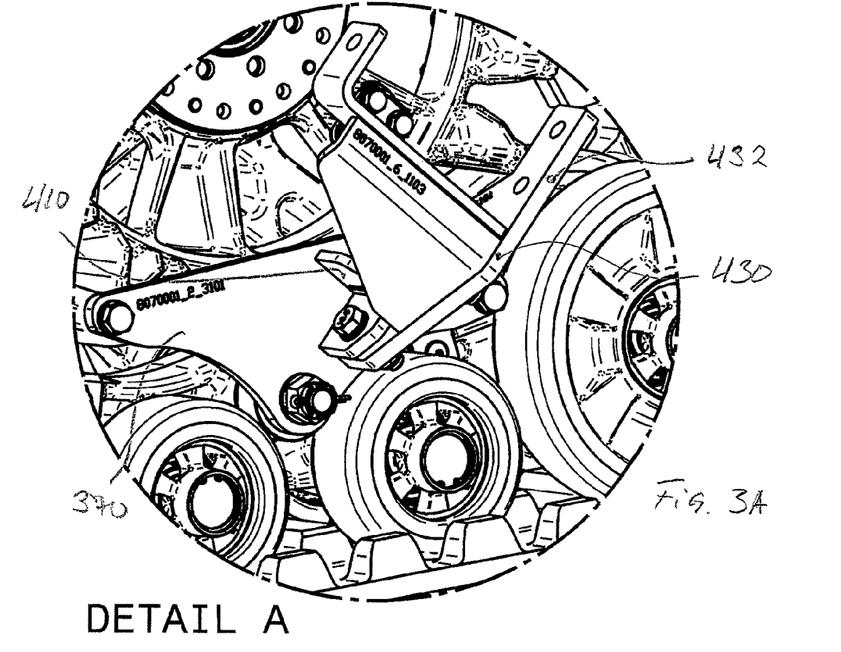
FIG. 3A an enlarged detailed view of the encircled section identified as A in FIG. 3.
Figure 4:
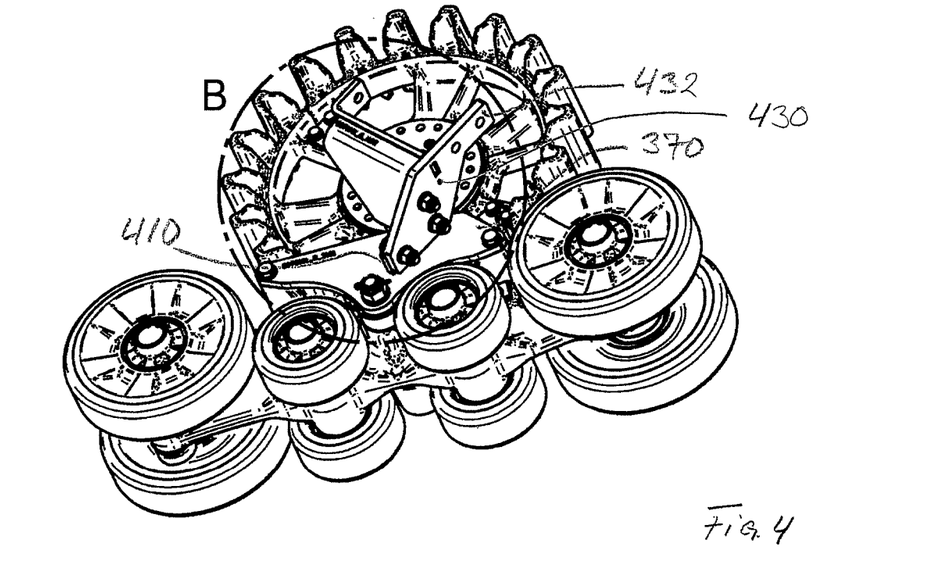
FIG. 4 is another perspective view of the interior side of the track system of FIG. 1, without the traction band.
Figure 4A:
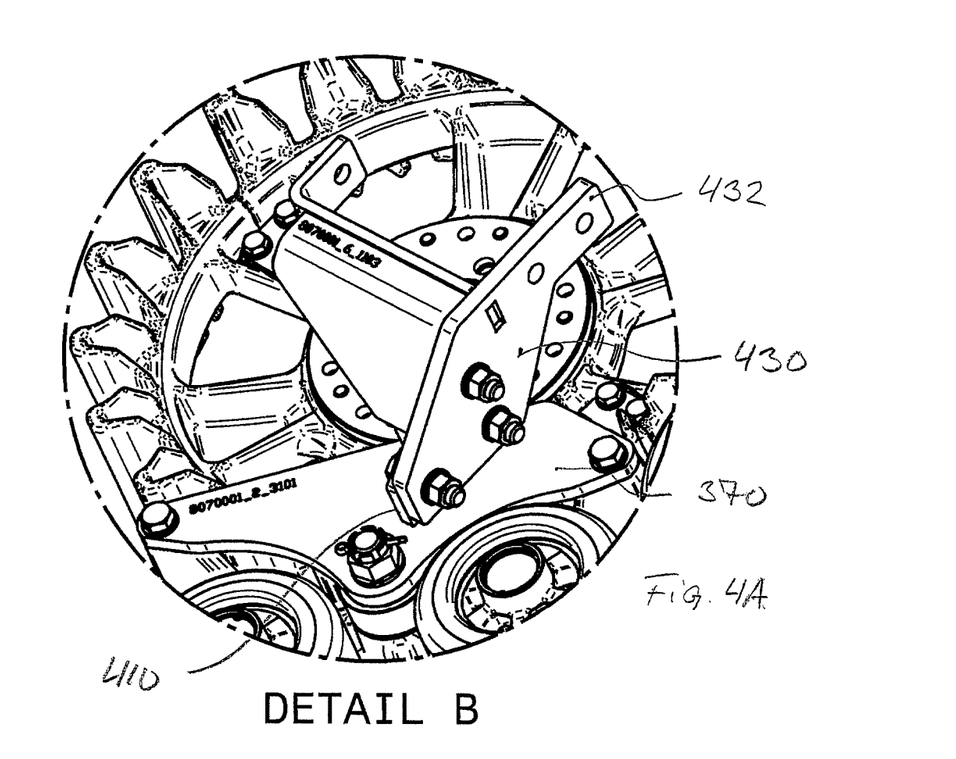
FIG. 4A is an enlarged detailed view of the encircled section identified as B in FIG. 4.

In the present embodiment, the link 400 comprises two sections 410 and 430 which are bolted together as shown in FIGS. 3A, 4A and 9. Understandably, in some other embodiments, the sections 410 and 430 could be welded or otherwise rigidly fastened together. In still other embodiments, the link 400 could be unitary.

Figure 7:
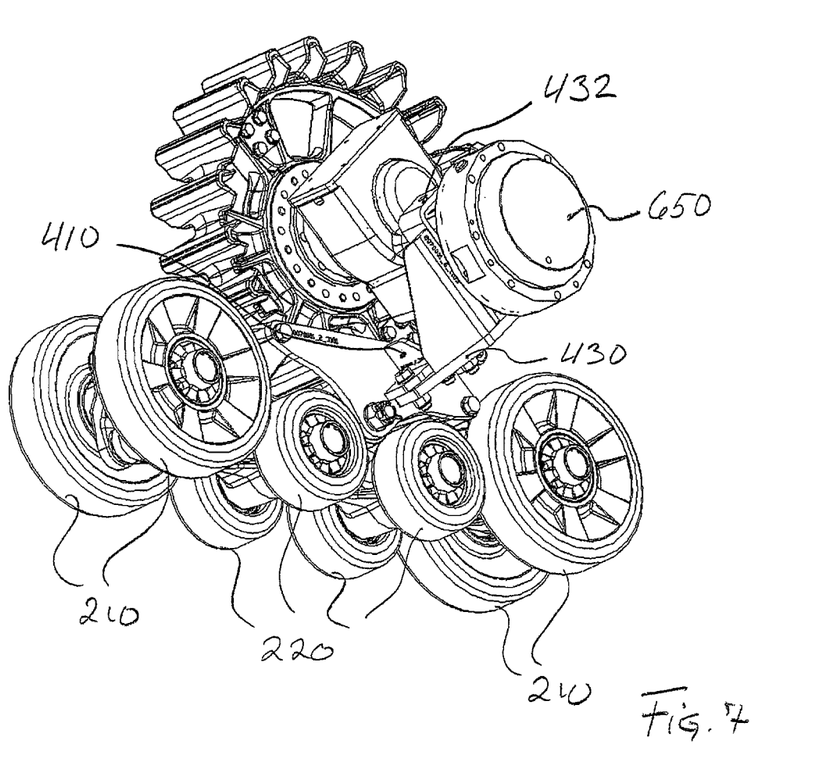
FIG. 7 is a perspective view of the interior side of the track system of FIG. 1, without the traction band and mounted to the axle/hub of a partially shown vehicle.

In the present embodiment, the first section 410 is preferably welded or otherwise fixedly mounted to the back plate 370 of the support member 300 while the second section 430 is configured to be bolted or otherwise fixedly yet preferably removably attached to the frame 650 of the vehicle to which the track system 10 is mounted (see FIG. 7). In that sense, in the present embodiment, the second section 430 comprises a C-shaped clamp portion 432 configured to at least partially circumscribe the frame 650 of the vehicle.

Understandably, the size and shape of the clamp portion 432 depend on the configuration of the frame 650 of the vehicle to which the track system 10 is attached.

As the movement limiting link 400 is rigidly connected to both the support member 300, via the back plate 370, and the vehicle to which the track system 10 is mounted, the link 400 prevents longitudinal and lateral movements of the support member 300 with respect to the vehicle.

With respect to the longitudinal movements, the link 400 prevents forward and/or backward rotating movements of the support member 300 about the rotation axis 101 of the sprocket wheel 100.

As for the lateral movements, the link 400 prevents lateral movements of the support member 300, and thus of the track system 10 when the latter is subjected to lateral loads (e.g. when the vehicle turns). Additionally, the link 400 reduces lateral loads that would otherwise be directly transmitted to the axle/hub 600 and/or to the frame 650 of the vehicle. This, it turns, prevents or at least reduces the possibility of damaging the axle/hub 600 and/or the frame 650 to which the track system 10 is mounted.

It is however to be understood that the movement limiting link 400 does not prevent pivoting movements of the support frame 200 with respect to the support member 300. Indeed, since the back plate 370 is not rigidly coupled to the support frame 200, the support frame 200 will remain free to pivot even if the back plate 370 remains immobile. Notably, these pivoting movements of the support frame 200 are welcomed, though in limited amplitude, since they allow the track system 10 to follow the shape of the terrain over which it is operated.

Referring now to FIGS. 1, 3, 8 and 9, the traction band 500, which is illustrated substantially schematically, comprises a main body 510 made from reinforced elastomeric material and defining an inner wheel-engaging surface 530 and an outer ground-engaging surface 550.

The inner surface 530 is provided with rows of longitudinally aligned drive lugs 534 and guide lugs 532 and 536. The guide lugs 532 and 536 are laterally spaced from the drive lugs 534 to define wheel paths 533 and 535 for the wheels 210 and 220 of the support frame 200. The drive lugs and guide lugs 532, 534 and 536 are preferably laterally aligned along the pitch sections 515 of the track 500.

The drive lugs 534 are configured to be engaged by the sprocket teeth 110 of the sprocket wheel 100 to transmit power from the sprocket wheel 100 to the traction band 500, whereas the guide lugs 532 and 536 are configured to guide the track 500 about the wheels 210 and 220 and to generally prevent lateral movements of the track 500.

Though not shown, the outer surface 550 of the traction band 500 is typically provided with a tread pattern comprised of a series of ground-engaging traction lugs. An exemplary pattern of traction lugs is shown in commonly assigned International patent application no. PCT/CA2009/001795 published under no. WO 2010/066043. Other tread patterns are also possible.

The present embodiment of the track system 10 is typically configured and used to replace the wheel of a normally wheeled vehicle. For example, a pair of track systems 10 could be used to replace the rear wheels of a farming tractor. In yet another example, four track systems 10 could be used to replace the four wheels of a construction front loader using articulated steering.

Understandably, though the general configuration of the track system 10 could be similar for most vehicles, the configuration of the movement limiting link 400 is subject to more or less important adaptations or modifications as each vehicle has its own frame 650 configuration. Still, in every configuration, the movement limiting link 400 is rigidly mounted to both the support member 300, typically, but not necessarily, via the back plate 370, and to the vehicle frame 650. Understandably, in some other embodiments, the movement limiting link 400 could be directly connected to the shaft 352 and/or to the arms 336 and 338.

In used, when a normally wheeled vehicle is equipped with track systems 10, the track systems 10 provide increased traction and floatation to the vehicle. Moreover, as the track system 10 is prevented from moving longitudinally and/or laterally, the track system 10 generally fits within the space envelop of the wheel it replaces. In that sense, due to the movement limiting link, the track system 10 will be prevented from contacting or interfering with the vehicle and its surroundings equipments (e.g. fenders, tank, vehicle chassis, three point hitches, etc.).

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:
1. A track system comprising:
   a) a sprocket wheel configured to be mounted to a wheel hub of a vehicle;
   b) a substantially longitudinally extending support frame having a front end and a rear end, the support frame comprising idler wheels pivotally mounted at the front and rear ends, and road wheels pivotally mounted in-between;
   c) substantially vertically extending support member comprising an upper portion, a middle portion and a lower portion, the upper portion being non-drivingly mounted to the sprocket wheel, the middle portion comprising a first projection extending forwardly and a second projection extending rearwardly, the first projection comprising a first arm extending laterally inwardly, and the second projection comprising a second arm extending laterally inwardly, and the lower portion comprising a first shaft extending laterally inwardly and being pivotally mounted to the support frame, and;
   d) a link comprising a first end rigidly coupled to the first and second arms of the middle portion of the support member and to the first shaft, and a second end configured to be rigidly mounted to the vehicle;
   e) an endless traction band disposed around the sprocket wheel, the idler wheel and the road wheels.

2. A track system as claimed in claim 1, wherein the sprocket wheel further comprises a second shaft laterally extending therefrom, and wherein the upper portion is non-drivingly mounted to the second shaft.

3. A track system as claimed in claim 2, wherein the second shaft comprises a radially extending flange configured for attachment to the sprocket wheel.

4. A track system as claimed in claim 3, wherein the flange is configured for attachment to an outer side of the sprocket wheel.

5. A track system as claimed in claim 4, further comprising a disk configured for attachment to an inner side of the sprocket wheel and to the wheel hub of the vehicle.

6. A track system as claimed in claim 5, wherein the flange comprises a first set of apertures, wherein the disk comprises a second set of apertures and a third set of apertures, and wherein the first and second apertures are substantially aligned.

7. A track system as claimed in claim 1, further comprising a member secured to the first and second arms and to the first shaft, and wherein the first end of the link is rigidly coupled to the member.

8. A track system as claimed in claim 1, wherein the first and second arms are substantially parallel.

9. A track system as claimed in claim 1, wherein the sprocket wheel defines a first rotation axis, wherein the first shaft defines a second rotation axis, and wherein the second rotation axis is lower than the first rotation axis.

10. A track system as claimed in claim 9, wherein the second rotation axis is longitudinally displaced with respect to the first rotation axis.

11. A track system as claimed in claim 9, wherein the second rotation axis is parallel to the first rotation axis.

12. A track system as claimed in claim 1, wherein the link comprises a first section and a second section.

13. A track system in combination with a vehicle comprising a frame and at least one wheel hub, the track system comprising:
   a) a sprocket wheel connected to the at least one wheel hub of the vehicle;
   b) a substantially longitudinally extending support frame having a front portion, a rear portion, and a middle portion therebetween, the support frame comprising idler wheels pivotally mounted to the front and rear portions, and road wheels pivotally mounted to the middle portion;
   c) a substantially vertically extending support member comprising an upper portion, a middle portion and a lower portion, the upper portion being non-drivingly connected to the sprocket wheel, the middle portion comprising a first projection extending forwardly and a second projection extending rearwardly, the first projection comprising a first arm extending laterally inwardly, and the second projection comprising a second arm extending laterally inwardly, and the lower portion comprising a first shaft extending laterally inwardly and being pivotally mounted to the support frame;
   d) a link rigidly connected to the first and second arms and to the first shaft of the support member and to the frame of the vehicle;
   e) an endless traction band disposed around the sprocket wheel, the idler wheel and the road wheels.

14. A combination as claimed in claim 13, wherein the sprocket wheel comprises a second shaft extending laterally therefrom and comprising a radially extending flange connected to the sprocket wheel.

15. A combination as claimed in claim 14, wherein the flange is connected to an outer side of the sprocket wheel.

16. A combination as claimed in claim 15, further comprising a disk connected to an inner side of the sprocket wheel and to the at least one wheel hub of the vehicle.

17. A combination as claimed in claim 16, wherein the flange comprises a first set of apertures, wherein the disk comprises a second set of apertures and a third set of apertures, and wherein the first and second apertures are substantially aligned.

18. A combination as claimed in claim 13, wherein the support member further comprises a back member connected to the first and second arms.

19. A combination as claimed in claim 18, wherein the link is connected to the back member.

20. A combination as claimed in claim 13, wherein the sprocket wheel defines a first rotation axis, wherein the first shaft defines a second rotation axis, and wherein the second rotation axis is lower than the first rotation axis.

21. A combination as claimed in claim 20, wherein the second rotation axis longitudinally displaced with respect to the first rotation axis.

22. A combination as claimed in claim 20, wherein the second rotation axis is parallel to the first rotation axis.

* * * * *